(12) United States Patent
Gewinner et al.

(10) Patent No.: US 8,585,158 B2
(45) Date of Patent: Nov. 19, 2013

(54) SAFE CONTROL OF A BRAKE USING LOW POWER CONTROL DEVICES

(75) Inventors: Juergen Gewinner, Berlin (DE); Marvin Dehmlow, Berlin (DE)

(73) Assignee: Otis Elevator Company, Farmington, CT (US)

( * ) Notice: Subject to any disclaimer, the term of this patent is extended or adjusted under 35 U.S.C. 154(b) by 307 days.

(21) Appl. No.: 12/999,239

(22) PCT Filed: Jun. 17, 2008

(86) PCT No.: PCT/US2008/007523
§ 371 (c)(1),
(2), (4) Date: Dec. 15, 2010

(87) PCT Pub. No.: WO2009/154591
PCT Pub. Date: Dec. 23, 2009

(65) Prior Publication Data
US 2011/0094837 A1    Apr. 28, 2011

(51) Int. Cl.
*B60T 8/78* (2006.01)
(52) U.S. Cl.
USPC .......................................... 303/199; 363/21.11
(58) Field of Classification Search
USPC ................... 303/199; 363/21.11, 21.1, 21.04; 188/156, 157, 158, 161, 162
See application file for complete search history.

(56) References Cited

U.S. PATENT DOCUMENTS

| 4,023,655 | A | * | 5/1977 | Anzai et al. .................. 188/171 |
| 4,307,793 | A | | 12/1981 | Caputo |
| 4,368,501 | A | | 1/1983 | Gingrich |
| 4,671,390 | A | | 6/1987 | Stanyard et al. |
| 4,809,150 | A | | 2/1989 | Limuti et al. |
| 4,958,707 | A | | 9/1990 | Yoneda et al. |
| 5,157,228 | A | | 10/1992 | Ackermann et al. |
| 5,247,140 | A | | 9/1993 | Iwasa et al. |
| 5,255,760 | A | | 10/1993 | Lamb et al. |
| 5,387,769 | A | | 2/1995 | Kupersmith et al. |

(Continued)

FOREIGN PATENT DOCUMENTS

| EP | 1225150 | 7/2002 |
| EP | 1431226 | 6/2004 |

(Continued)

OTHER PUBLICATIONS

PCT International Search Report and Written Opinion, Dec. 3, 2009, 14 pages.

(Continued)

*Primary Examiner* — Thomas J Williams
(74) *Attorney, Agent, or Firm* — Kinney & Lange, P.A.

(57) ABSTRACT

A control circuit selectively energizes a load, such as an elevator or escalator brake (12). The circuit includes a transformer (28) with a primary-winding connected to a series with a semiconductor switch (40) that is driven by a pulse width modulation (PWM) controller. Power to the PWM controller is supplied through safety relay contacts (52A, 52B). When the load is to be energized, the safety relay contacts are closed and the PWM controller drives the semiconductor switch to supply energy through the transformer to the secondary circuit. A command signal to secondary circuitry (64) causes power in the secondary to be applied to the load (12). If the safety relay contacts open, the PWM controller turns off and power is no longer delivered to the secondary circuit and the load.

28 Claims, 1 Drawing Sheet

(56) References Cited

U.S. PATENT DOCUMENTS

| | | |
|---|---|---|
| 5,617,307 A | 4/1997 | Guigueno |
| 5,648,644 A | 7/1997 | Nagel |
| 5,717,174 A | 2/1998 | Ramos |
| 5,777,280 A | 7/1998 | Braasch et al. |
| 5,893,432 A | 4/1999 | Nguyen et al. |
| 5,900,597 A | 5/1999 | Fernkas |
| 6,173,813 B1 | 1/2001 | Rebillard et al. |
| 6,202,795 B1 | 3/2001 | Bluteau |
| 6,267,219 B1 | 7/2001 | Spannhake et al. |
| 6,311,801 B1 | 11/2001 | Takagi et al. |
| 6,563,707 B1 | 5/2003 | Engler et al. |
| 6,697,273 B1 | 2/2004 | Jahkonen et al. |
| 6,898,094 B2 | 5/2005 | Jahkonen et al. |
| 7,184,286 B2 | 2/2007 | Jahkonen et al. |
| 7,268,514 B2 | 9/2007 | DeLange et al. |
| 2007/0199775 A1* | 8/2007 | Yasukawa .................... 188/73.1 |
| 2007/0227828 A1 | 10/2007 | Kinpara et al. |
| 2007/0272491 A1 | 11/2007 | Kattainen et al. |
| 2008/0000726 A1 | 1/2008 | Robledo Barrio et al. |
| 2008/0029348 A1 | 2/2008 | Huard et al. |
| 2009/0127029 A1* | 5/2009 | Oesterle et al. ............... 187/290 |

FOREIGN PATENT DOCUMENTS

| | | |
|---|---|---|
| EP | 1544148 | 6/2005 |
| GB | 2153465 | 8/1985 |
| GB | 2323833 | 10/1998 |
| JP | 6054376 A | 2/1994 |
| JP | 2002315351 A | 10/2002 |
| JP | 2003235258 A | 8/2003 |
| WO | WO 9742118 | 11/1997 |
| WO | WO 03031309 | 4/2003 |
| WO | WO 2005047157 | 5/2005 |
| WO | WO 2007118576 | 10/2007 |
| WO | WO 2007144948 | 12/2007 |

OTHER PUBLICATIONS

Korean Patent Office, Korean Office Action, Jul. 11, 2012, 5 pages.
Japanese Patent Office, Office Action, Aug. 28, 2012, 3 pages.
State Intellectual Property Office, P.R. China, First Office Action, Feb. 5, 2013, 7 pages.

* cited by examiner

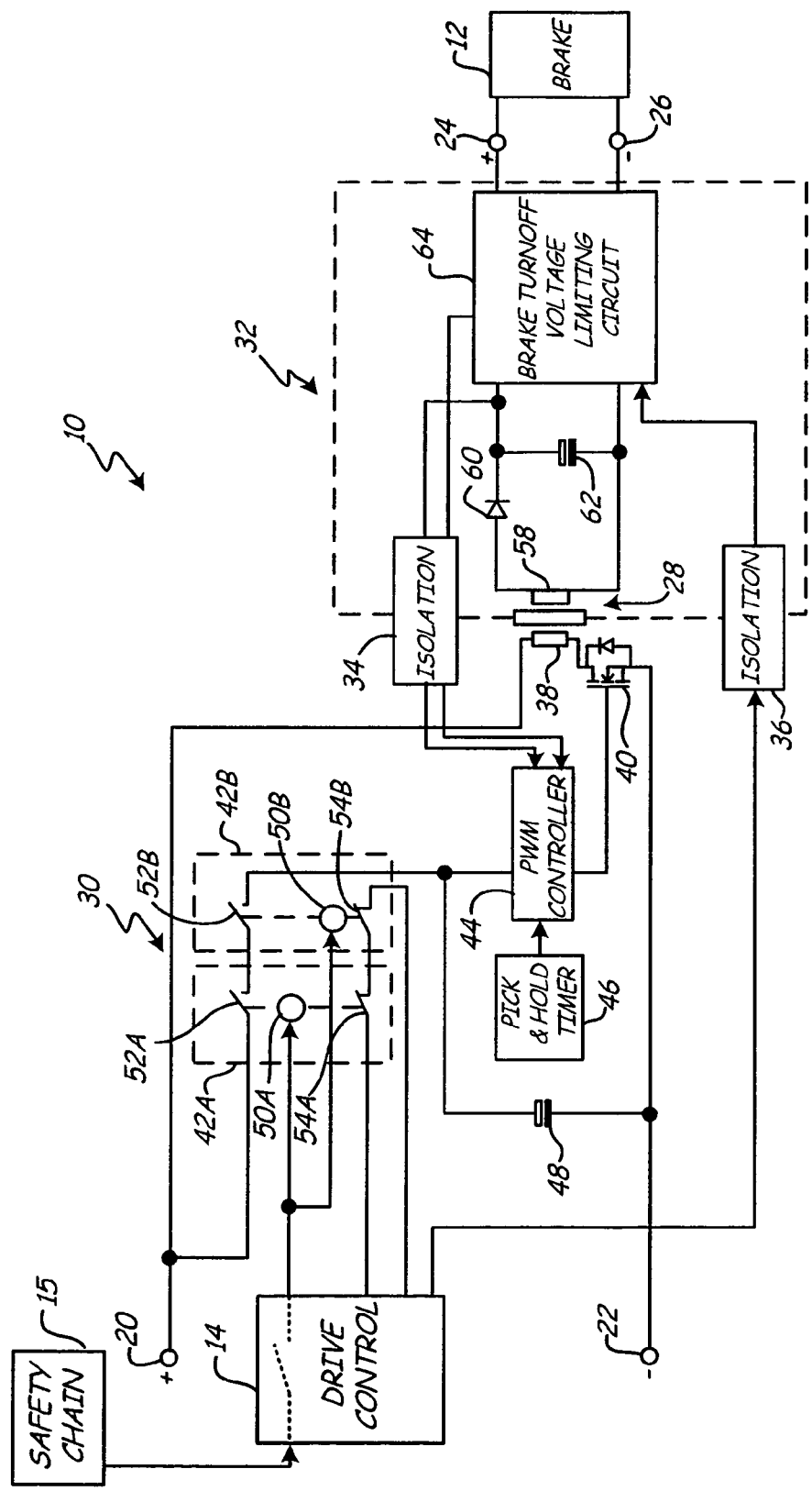

SAFE CONTROL OF A BRAKE USING LOW POWER CONTROL DEVICES

BACKGROUND

The present invention relates to control circuits for controlling operation of an electrical load, such as an electromagnetic brake, using low power safety relays.

Elevator systems typically make use of an electromagnetic brake to hold the elevator car in position when the car is stopped, and to provide emergency braking in the event of an over-speed or over-acceleration condition, a controller circuitry failure, or loss of power. A typical elevator system may include a hoist motor having a drive shaft for rotating a sheave; and a cable, belt, or rope that extends over the sheave and between the elevator car and a counterweight. An elevator brake is mounted on or adjacent the motor drive shaft or the sheave to control rotation of the shaft and sheave.

The elevator brake is typically an electromagnetic brake that is spring biased so that a brake pad or shoe is pressed against a braking surface when there is no current flowing through the brake coil. The brake is released, allowing rotation of the drive shaft and movement of the elevator car, when a sufficient current flows through the brake coil to move the brake pad or shoe out of contact with the braking surface. The current required to move the pad or shoe so that the brake is released is referred to as the pick current or lift current. Once the shaft is rotating and the car is moving, the amount of current required to maintain the brake pad or shoe out of contact with the braking surface (referred to as the hold current) is less then the pick or lift current. When the power applied to the brake coil is turned off, the electromagnetic field collapses, and the brake pad or shoe is moved by the spring by its back into contact with the braking surface.

The hoist drive motor of an elevator system may be an induction motor driven by an inverter that converts DC voltage to an AC drive. A drive control may control operation of both the drive motor and a brake control circuit that energizes and denergizes the electromagnetic elevator brake. An elevator control controls the starting, running, and stopping of elevator cars, and provides signals to the drive control to coordinate operation of the drive motor and the elevator brake.

The brake circuit may also be powered by DC power, and includes relays or semiconductor switches to control the delivery of the DC power to the electromagnetic brake. The relays or semiconductor switches must be capable of energizing and denergizing the brake in response to control signals from the drive control, and also must be capable of denergizing the brake to stop the elevator car when a potentially unsafe condition occurs.

Elevator systems typically make use of a safety chain that includes hoistway door contacts on each hoistway door that are connected in series with the power supply and drive motor of the elevator. A top of car inspection switch and a pit emergency stop switch may also be connected in the safety chain. The opening of a single hoistway door contact will break a connection between the power supply and the drive motor and the elevator brake, and prevent movement of the car as long as the hoistway door is open.

During a normal stop at a floor, the hoistway door and the elevator car doors will open for a short period of time to allow passengers to enter or exit the elevator car. The doors will then close again, and the safety chain is closed so that elevator brake is released and the car can move in the hoistway to its next stop.

If a hoistway door is opened manually when a car is not in position adjacent that hoistway door (i.e. an abnormal opening of the hoistway door has occurred), the safety system will prevent normal operation of the elevator until a latch condition caused by the abnormal opening is safely cleared. The safety system operates on an assumption that whenever an abnormal opening of a hoistway door occurs, a person or persons could have entered the elevator hositway. To prevent possible injury of authorized or unauthorized personnel that may have entered the hoistway while the hoistway door was open, the elevator system enters a shutdown condition that prevents elevator motion until a special sequence is followed.

Currently, elevator brakes are typically controlled by large relay contacts or expensive semiconductor switches. The entire energy flow from the power source to the brake coil is switched by these relay contacts or switches. As the requirements of elevator systems have evolved, larger more powerful electromagnetic brakes are required. The high inductance and greater power demands of these larger brakes has required safety relay contacts that are capable of switching high currents. This can result in shorter operating life of the safety relays. In addition, the properties of the safety relays required for larger electromagnetic brakes has precluded the mounting of the safety relays on a common circuit board with the other circuitry of the brake control, and has complicated wiring because the safety relays are connected in series with the brake.

SUMMARY

A control circuit controls delivery of electrical power to an electrical load such as, for example, an electromagnetic brake used in an elevator or escalator system. The circuit includes input terminals for receiving electrical power from a power source, and output terminals for delivering electrical power to the load. The circuit includes a transformer having primary and secondary windings. A primary circuit includes a semiconductor switch in series with the primary winding, a pulse width modulation controller for driving the semiconductor switch, and safety relays for controlling power to the pulse width modulation controller. A secondary circuit includes a secondary winding, a rectifier, and a voltage limiting circuit. Isolation circuitry provides a feedback signal from the secondary circuit to the pulse width modulation controller, and provides a control signal to the secondary circuit to rapidly dissipate current in the load when the safety relays remove power from the pulse width modulator.

BRIEF DESCRIPTION OF THE DRAWINGS

The FIGURE is a schematic diagram of a safety control circuit for an elevator/escalator brake.

DETAILED DESCRIPTION

The FIGURE shows brake control circuit 10, which receives unregulated DC voltage, and supplies DC power to an electrical load, such as electromagnetic brake 12. In this embodiment, brake 12 is a typical elevator or escalator brake, which is spring biased to prevent movement when denergized, and which allows movement of the elevator or escalator when energized.

Drive control 14 provides control inputs to brake control circuit 10 to initiate elevator (or escalator) movement by energizing brake 12, and stopping or holding the elevator in place by denergizing brake 12. Drive control 14 also may provide drive control signals to control operation of an elevator or escalator drive motor (not shown). Drive control 14 is responsive to safety chain 15, so that brake 12 and the drive motor are energized only when safety chain 15 is closed. Alternatively, brake control circuit 10 may be directly responsive to safety chain 15.

Brake control circuit 10 includes input terminals 20 and 22, output terminals 24 and 26, transformer 28, primary circuit 30, secondary circuit 32 and isolation circuits 34 and 36. Transformer 28 and isolation circuits 34 and 36 provide electrical isolation between primary circuit 30 and secondary circuit 32, and between drive control 14 and secondary circuit 32.

Primary circuit 30 includes primary winding 38 of transformer 28, semiconductor switch 40, safety relays 42A and 42B, pulse width modulation (PWM) controller 44, pick and hold timer 46, and capacitor 48. Safety relay 42A includes relay coil 58, safety relay contacts 52A, and supervising contacts 54A. Similarly, safety relay 42B includes relay coil 50B, safety relay contacts 52B, and supervising contacts 54B.

Secondary circuit 32 includes secondary winding 58, rectifier 60, smoothing capacitor 62, and brake turn off voltage limiting circuit 64.

Both brake control circuit 10 and drive control 14 are involved in control of brake 12. Drive control 14 provides a brake lift command signal through isolation circuit 36 to brake turnoff voltage limiting circuit 64. To open brake 12, drive control 14 causes the brake lift command signal to command brake turnoff voltage limiting circuit 64 to apply power in secondary circuit 60 to brake 12 to lift or release brake 12. To close brake 12, drive control 14 causes the brake lift command signal to command brake turnoff voltage limiting circuit 64 to remove power to brake 12.

To release brake 12, safety chain 15 must be closed, so that brake control circuit 10 can supply power from primary circuit 30 to secondary circuit 32. When safety chain 15 is closed, drive control 14 provides power to relay coils 50A and 50B, (or coils 50A and 50B may be directly energized by closure of safety chain 15). Coils 50A and 50B are energized, so that normally open safety relay contacts 52A and 52B close, while normally closed supervising contacts 54A and 54B open. Drive control 14 monitors the status of safety relays 42A and 42B by monitoring a loop that contains supervising contacts 54A and 54B.

With safety relay contacts 52A and 52B closed, current flows from positive input terminal 20 through contacts 52A and 52B to PWM controller 44, pick and hold timer 46, and capacitor 48. PWM controller 44 begins to provide drive pulses to the control electrode of semiconductor switch 40 (which may be, for example, a MOSFET, or IGBT or other power semiconductor device). When switch 40 is turned on, current flows from input terminal 20 through primary winding 38 and switch 40 to negative input terminal 22. When the drive pulse from PWM controller 44 ends, switch 40 turns off which interrupts the current flow through primary winding 38.

Transformer 28 is a high frequency switching transformer. As pulses from PWM controller 44 turn switch 40 on and off, energy is transmitted from primary winding 38 to secondary winding 58. The pulsed current flow induced in secondary winding 58 is rectified by rectifier 60 and is smoothed by smoothing capacitor 62 to establish a voltage at the input of brake turnoff voltage limiting circuit 64. The rectified voltage is a function of the duty cycle of PWM controller 44.

Initially, a higher voltage and larger current is required in order to allow the brake coil of electromagnetic brake 12 to lift the brake pad or shoe out of engagement with the braking surface. Once the pad or shoe has been lifted or picked, the current to brake 12 can be reduced.

PWM controller 44 receives a voltage feedback signal through isolation circuit 34 indicating the voltage level of the rectified voltage in secondary circuit 32. Based upon that voltage feedback, PWM controller 44 will control the pulse width of the drive pulses delivered to IGBT 40.

Once the brake has been lifted, PWM controller 44 can reduce the secondary voltage by reducing the pulse width of drive pulses to switch 40. The determination of when to reduce voltage in the secondary to produce the desired holding current level can be provided either by a current feedback signal supplied from brake turnoff voltage limiting circuit 64 through isolation circuit 34 to PWM controller 44, or by a control signal from pick and hold timer 46. In either case, PWM controller 44 reduces the pulse width of the drive pulses to switch 40 and continues to monitor the voltage feedback from secondary circuit 32 to maintain the secondary voltage at a level that will establish the desired holding current. In another embodiment, the current feedback signal can be provided through an additional winding on transformer 28, rather than a separate isolation circuit 34.

If safety chain 15 opens, relay coils 50A and 50B are denergized either directly by safety chain 15 or through drive control 14. As a result, safety contacts 52A and 52B open, which removes power to PWM controller 44. Generation of drive pulses to switch 40 ceases, and current no longer flows through primary winding 38. Power is no longer supplied to secondary circuit 32, and brake 12 is dengergized and closes. Thus brake control circuit 10 provides for an emergency stop when safety chain 15 opens.

During normal operation of an elevator, the hoist motor may be controlled to slow the movement of the car as it approaches a floor at which it will stop. The denergizing of brake 12 may, in those circumstances, occur shortly before or after a car has come to a stop. Drive control 14 removes or changes the brake lift command signal to cause brake turnoff voltage limiting circuit 64 to remove power from brake 12, so that brake 12 closes. When the hoistway and elevator doors open, safety chain 15 opens, which causes relay contacts 52A and 52B to open and supervising contacts 54A and 54B to close. When one or both of safety relay contacts 52A and 52B open, the power to PWM controller 44 is interrupted. That stops the generation of gate pulses to switch 40, and stops current flow through primary winding 38. As a result, energy no longer flows through transformer 28 from primary winding 38 to secondary winding 58.

When safety relay contacts 52A and 52B open, power is no longer supplied to secondary circuit 32, and only the residual energy stored in capacitor 62 and in the coil of brake 12 remains. That energy is dissipated in brake turnoff voltage limiting circuit 64.

When the elevator and hoistway doors close, safety chain 15 closes, and relay contacts 52A and 52B close. That allows primary circuit 30 to be reenergized, and power is again transferred to secondary circuit 32. Drive control 14 can then provide the brake lift command signal through isolation circuit 36 to brake turnoff voltage limiting circuit 64 to energize and open brake 12.

Safety relays 42A and 42B can also be switched when an emergency stop is required. For example, if an overspeed or overacceleration condition is sensed, safety chain 15 opens in response to those sensed conditions which removes power to relay coils 50A and 50B (either directly or through drive control 14). As soon as the brake lift command is removed, safety contacts 52A and 52B open, which removes power from PWM controller 44 and results in denergization of brake 12.

Similarly, if power to drive control 14 is lost, or drive control 14 fails, so that it can no longer provide the brake lift command signal, and brake 12 will be denergized and close. If drive control 14 also controls coils 50A and 50B, a loss of power or other failure, even if safety chain 15 is still closed, will cause safety relay contacts 52A and 52B to open, causing PWM controller 44 to stop driving switch 40. The result is that brake 12 is denergized, and the brake pad or shoe engages the braking surface to stop shaft rotation and elevator car movement.

Brake control circuit 10 also operates in a failsafe manner if the unregulated DC voltage supplied to input terminals 20 and 22 fails. In that case, no energy is transferred through transformer 28 from primary circuit 30 to secondary circuit 32. In the absence of electrical energy in secondary circuit 32, brake 12 is denergized to stop shaft rotation and movement of the elevator car.

Brake control circuit 10 makes use of low power safety relays to control a brake that may require high power. Safety relay contacts 52A and 52B are not in the main current path from positive input terminal 20, through primary winding 38 and switch 40 to negative input terminal 22. Instead, safety relay contacts 52A and 52B control the delivery of power to PWM controller 44, pick and hold timer 46, and capacitor 48. As a result, the amount of power that is switched by safety relay contacts 52A and 52B is much lower than the total power passing through brake control circuit 50 from input terminals 20 and 22 to output terminals 24 and 26.

Safety relay contacts 52A and 52B switch low power, i.e. only power to PWM controller 44 rather than the power that flows through transformer 28. As a result, they can be smaller, and can be mounted on a printed circuit board. Relatively low power connections can be made from drive control 14 to brake circuit 10, since the connections involve only energizing safety relay coils 50A and 50B and monitoring the current loop containing supervising contacts 54A and 54B. This also simplifies wiring of brake 12, because it does not have to be wired through relay contacts 52A and 52B.

Although control circuit 10 has been described in the context controlling energizing and de-energizing an elevator brake, circuit 10 is applicable to other applications or controlling power to a load. In addition to the application to escalator brakes, circuit 10 can also be used to control power in elevator and escalator systems to control supply of power to motors. It can also be used in other systems to control the energizing of electrical loads. Although inductive loads have been described, the control circuit can be used to control delivery of power to capacitive loads, ohmic loads, and inductive loads.

Although the present invention has been described with reference to preferred embodiments, workers skilled in the art will recognize that changes may be made in form and detail without departing from the spirit and scope of the invention.

The invention claimed is:

1. A brake control circuit comprising:
   input terminals for receiving DC power from a power source;
   output terminals for connection to electromagnetic brake that is spring biased to prevent movement when de-energized and that allows movement when energized;
   a transformer having a primary and a secondary;
   a semiconductor switch connected in series with the primary between the input terminals;
   a pulse width modulation (PWM) controller for providing PWM drive pulses to the semiconductor switch;
   a safety control circuit connected to the input terminals for controlling operation of the PWM controller, the safety control circuit including safety relay contacts connected to control power from the input terminals to the PWM controller, wherein the safety control circuit further includes supervising contacts; and
   a secondary circuit connected between the secondary and the output terminals for energizing and de-energizing the electromagnetic brake in response to a command signal, the secondary circuit de-energizing the electromagnetic brake to prevent movement when the safety control circuit removes power to the PWM controller.

2. The brake control circuit of claim 1 and further comprising:
   isolation circuitry for providing a feedback signal to the PWM controller from the secondary circuit; and
   wherein the PWM controller reduces pulse width of the PWM drive pulses in response to the feedback signal.

3. The brake control circuit of claim 2, wherein the secondary circuit further comprises a voltage limiting circuit responsive to the command signal for selectively dissipating energy in the secondary circuit.

4. The brake control circuit of claim 1, wherein the secondary circuit comprises a rectifier and a smoothing capacitor for converting energy received by the secondary to a DC voltage.

5. The brake control circuit of claim 1 and further comprising:
   a drive control for providing the command signal to the secondary circuit.

6. The brake control circuit of claim 5, wherein the drive control is responsive to a safety chain to cause the safety relay contacts to close when safety chain is closed and to cause the safety relay contacts to open when the safety chain is open.

7. The brake control circuit of claim 6, wherein the supervising contacts are monitored by the drive control circuit.

8. The brake control circuit of claim 7, wherein the safety relay contacts are normally open and the supervising contacts are normally closed.

9. The brake control circuit of claim 1, wherein the PWM controller reduces pulse width of the PWM drive pulses in response to a feedback signal.

10. The brake control circuit of claim 1, wherein the primary circuit further comprises a timer for causing the PWM controller to reduce pulse width of the PWM drive pulses after a time interval following commencement of the PWM pulses being provided to the switch.

11. A control circuit comprising:
    input terminals for receiving DC power from a power source;
    output terminals for connection to an electrically controlled load;
    a transformer having a primary and a secondary;
    a primary circuit comprising:
      a switch connected in series with the primary between the input terminals;
      a pulse width modulation (PWM) controller for controlling the switch to cause energy to flow from the primary to the secondary;
      a safety control circuit connected to the input terminals for controlling operation of the PWM controller, the safety control circuit including safety relay contacts connected to control power from the input terminals to the PWM controller, wherein the safety control circuit further includes supervising contacts; and a secondary circuit comprising:
   a rectifier connected to the secondary;
   a voltage limiting circuit connected between the rectifier and the output terminals; and
   isolation circuitry for providing a feedback signal from the secondary circuit to the PWM controller and a command signal to the voltage limiting circuit to control energization of the load.

12. The control circuit of claim 11, wherein the safety relay contacts are normally open and the supervising contacts are normally closed.

13. The control circuit of claim 11, wherein the voltage limiting circuit dissipates energy in the secondary circuit in response to the PWM controller turning off when the safety relay contacts switch from a closed state to an open state.

14. The control circuit of claim 11, wherein the PWM controller is denergized when the safety relay contacts are in an open state.

15. The control circuit of claim 14, wherein the PWM controller, when energized, provides PWM drive pulses to the switch.

16. The control circuit of claim 15, wherein the PWM controller reduces pulse width of the PWM drive pulses in response to the feedback signal.

17. The control circuit of claim 16, wherein the feedback signal is a function of a voltage in the secondary circuit.

18. The control circuit of claim 16, wherein the feedback signal is a function of a current in the secondary circuit.

19. The control circuit of claim 15, wherein the primary circuit further comprises a timer for causing the PWM controller to reduce pulse width of the PWM drive pulses after a time interval following commencement of the PWM pulses being provided to the switch.

20. A control circuit comprising:
   input terminals for receiving DC power from a power source;
   output terminals for connection to an electrically controlled load;
   a transformer having a primary and a secondary;
   a primary circuit comprising:
      a switch connected in series with the primary between the input terminals;
      a pulse width modulation (PWM) controller for controlling the switch to cause energy to flow from the primary to the secondary;
      a safety control circuit connected to the input terminals for controlling operation of the PWM controller, the safety control circuit including safety relay contacts connected to control power from the input terminals to the PWM controller;
      a timer for causing the PWM controller to reduce pulse width of the PWM drive pulses after a time interval following commencement of the PWM pulses being provided to the switch; and
   a secondary circuit comprising:
      a rectifier connected to the secondary;
      a voltage limiting circuit connected between the rectifier and the output terminals; and
      isolation circuitry for providing a feedback signal from the secondary circuit to the PWM controller and a command signal to the voltage limiting circuit to control energization of the load.

21. A brake control circuit comprising:
   input terminals for receiving DC power from a power source;
   output terminals for connection to an electromagnetic brake;
   a transformer having a primary and a secondary;
   a semiconductor switch connected in series with the primary between the input terminals;
   a pulse width modulation (PWM) controller for providing PWM drive pulses to the semiconductor switch;
   a safety control circuit connected to the input terminals for controlling operation of the PWM controller, the safety control circuit including safety relay contacts connected to control power from the input terminals to the PWM controller;
   a secondary circuit connected between the secondary and the output terminals for energizing and de-energizing the electromagnetic brake in response to a command signal, the secondary circuit de-energizing the electromagnetic brake when the safety control circuit removes power to the PWM controller; and
   a drive control for providing the command signal to the secondary circuit, wherein the drive control is responsive to a safety chain to cause the safety relay contacts to close when safety chain is closed and to cause the safety relay contacts to open when the safety chain is open.

22. The brake control circuit of claim 21 and further comprising:
   isolation circuitry for providing a feedback signal to the PWM controller from the secondary circuit; and
   wherein the PWM controller reduces pulse width of the PWM drive pulses in response to the feedback signal.

23. The brake control circuit of claim 21, wherein the secondary circuit comprises a rectifier and a smoothing capacitor for converting energy received by the secondary to a DC voltage.

24. The brake control circuit of claim 21, wherein the secondary circuit further comprises a voltage limiting circuit responsive to the command signal for selectively dissipating energy in the secondary circuit.

25. The brake control circuit of claim 21, wherein the safety control circuit further includes supervising contacts that are monitored by the drive control circuit.

26. The brake control circuit of claim 25, wherein the safety relay contacts are normally open and the supervising contacts are normally closed.

27. The brake control circuit of claim 21, wherein the PWM controller reduces pulse width of the PWM drive pulses in response to a feedback signal.

28. The brake control circuit of claim 21, wherein the primary circuit further comprises a timer for causing the PWM controller to reduce pulse width of the PWM drive pulses after a time interval following commencement of the PWM pulses being provided to the switch.

* * * * *